T. D. BEINTEMA & D. DE ROOI.
AUTOMATIC MOTOR CONTROLLER.
APPLICATION FILED OCT. 7, 1909.
1,015,283.
Patented Jan. 23, 1912.
2 SHEETS—SHEET 2.
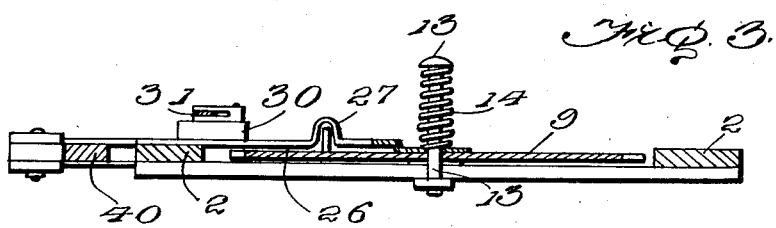
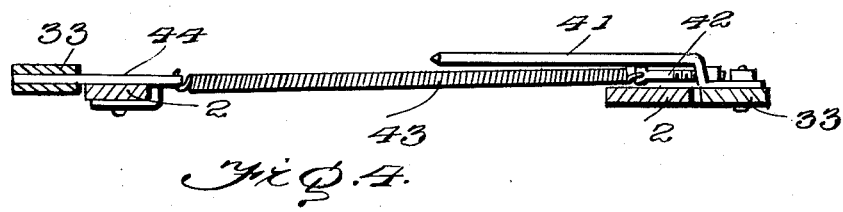
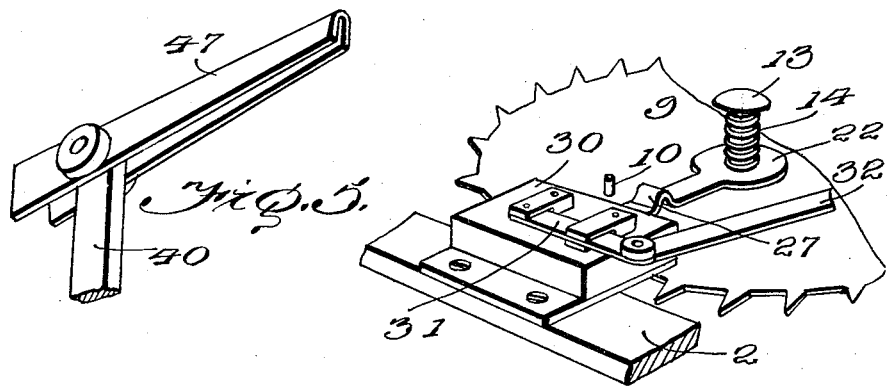
Witnesses
Inventor
Tjebbe D. Beintema
Dick DeRooi
By
Attorneys.

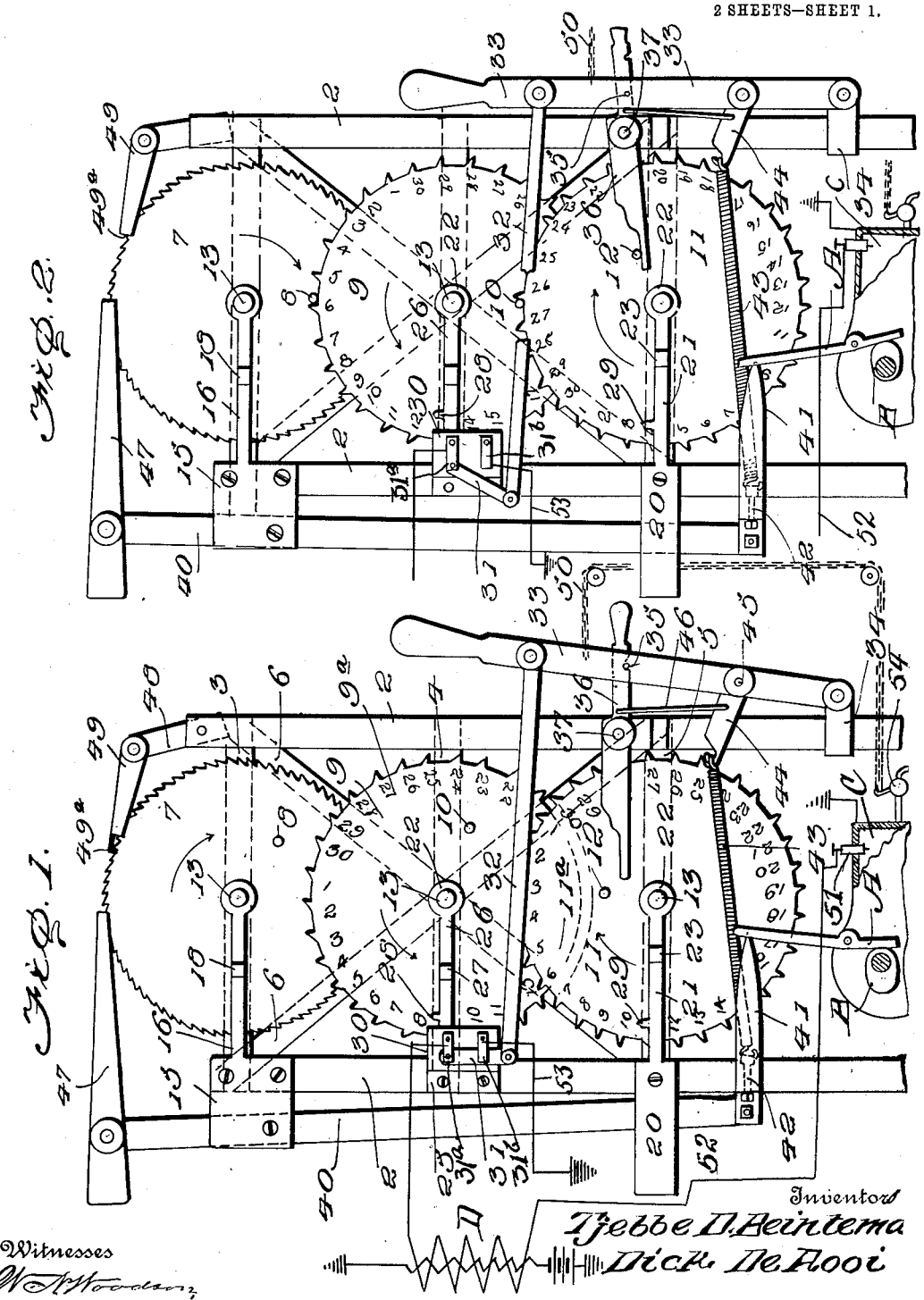

UNITED STATES PATENT OFFICE.

TJEBBE D. BEINTEMA AND DICK DE ROOI, OF OSKALOOSA, IOWA.

AUTOMATIC MOTOR-CONTROLLER.

1,015,283.   Specification of Letters Patent.   Patented Jan. 23, 1912.

Application filed October 7, 1909. Serial No. 521,553.

*To all whom it may concern:*

Be it known that we, TJEBBE D. BEINTEMA and DICK DE ROOI, citizens of the United States, both residing at Oskaloosa, in the county of Mahaska and State of Iowa, have invented certain new and useful Improvements in Automatic Motor - Controllers, of which the following is a specification.

Our invention relates to means for automatically shutting off power of stationary engines, and the invention is intended to be attached to a stationary gas engine or like motor where there is no attendant in charge and no one to stop the engine when the work desired of it is completed.

Gasolene engines are very largely used for the purpose of pumping water in mines and in farming operations. A gasolene engine, after it is started, needs no one in charge to look after it, but it does need an attendant to stop it after it has completed its work, otherwise it will continue to run, thereby wasting gasolene, electricity and oil, at a relatively heavy loss. In order to overcome this, operators of this class of engines, who have had no one to look after the engine, have filled the gasolene tank and the lubricator only with what oil seemed to be sufficient for the full operation of the engine to complete the work desired, but not only is this to a great extent guesswork, but even did the gasolene become exhausted, and the engine from lack of explosion shut down, the electric current and the lubricating oil would continue to flow until such time as they were shut off by hand, the battery became exhausted, or the oil supply ran out.

The object of our invention is to do away with this difficulty by providing a device which may be set by the operator so that the engine may run a predetermined time, and then the various operative parts of the engine may be shifted so as to shut off the lubricating oil, the gasolene and the flow of electricity, thereby saving a great deal of trouble.

With our invention, when the predetermined time is up, the switch in the electric circuit is broken, thereby stopping the engine, and the fuel supply and lubricant supply closed.

For a full understanding of the invention and the merits thereof, and to acquire a knowledge of the details of construction, reference is to be had to the following description and accompanying drawing, in which:

Figure 1 is a side elevation of our device, showing the switch closed and the shifting lever in its inoperative position; Fig. 2 is a like view, however, showing the switching lever in its operative position and the latch tripped; Fig. 3 is a transverse section on the line 3—3 of Fig. 1; Fig. 4 is a transverse section across the lower end of the frame; Fig. 5 is a detail perspective view of the dog 47, and, Fig. 6 is a detail perspective view of the switch and a portion of the adjacent mechanism.

Corresponding and like parts are referred to in the following description and indicated in all the views of the drawings by the same reference characters.

Referring to these figures, it will be seen that our device is supported on a rectangular frame of iron bars 2—2 having the cross bars 3, 4 and 5. Bolted to the rear of this frame, and extending diagonally across the cross bar 4 are the braces 6. This frame is preferably bolted together or the members of it otherwise attached to each other in any desired manner.

Pivotally mounted on the bar 3 is the ratchet disk 7 having ratchet teeth upon its circumference and provided with the outstanding pin 8 projecting from its face. Mounted on the bar 4 is the ratchet toothed disk 9 overlapping the disk 7 and provided with ratchet teeth with which the pin 8 engages once in every revolution of the disk 7. This disk 9 is provided with the outwardly projecting pin 10 and is also provided with a graduated scale $9^a$ upon its face. Rotatably mounted on the cross bar 5 is the disk 11 also provided with teeth upon its periphery with which the pin 10 engages, and having upon its face the outwardly projecting pin 12. This disk 11 is also provided with the graduated scale $11^a$. These disks are rotatably mounted on stud bolts 13 projecting from the transverse bars 3, 4 and 5, each stud bolt being surrounded by a spring 14 which acts to hold the disk in place. We do not wish to limit ourselves, however, to this mode of mounting the rotatable disks. It will be seen that one complete revolution of the disk 7 will cause a movement of the disk 9 equal to the space between the teeth on disk 9, while a complete rotation of the disk 9 will cause the disk 11 to move one step, or the distance between the teeth on disk 11. As shown, the three disks 7, 9 and 11 are so geared to each other that thirty revolutions of disk 7 will cause one revolution of disk 9, and that nine hundred revolutions of disk 7 will cause one revolution of disk 11.

Attached to the upper end of one of the longitudinally extending frame bars 2 are the opposed plates 15, one of which plates has the inwardly extending prolongation 16 having a perforated head at its end through which the stud bolt upon which the disk 7 is mounted, extends. This prolonged strip 16 is folded intermediate of its ends to form a bridge 18 to accommodate the pin 8 and permit the disk to be rotated. Supported oppositely to the center of the disk 11 is a plate 20 having an extension strip 21 formed with a perforated head 22 and the returned bend 23 forming the bridge permitting the passage of the pin 12. This strip is provided with a pointer 24 in registry with the graduated scale 11$^a$. Intermediate between the plates 15 and 20 is the plate 25 having the prolongation 26 through which the stud bolt passes. This strip 26 is curved to form a bridge to permit the passage of the pin 10, and is also provided with the pointer 28. Mounted on the plate 25 is the switch 30 which is connected to a spark coil. A switch arm 31 is connected by a connecting rod 32 to the setting lever 33 which is pivoted at its lower end in a clip 34. Said setting lever is provided with a pin 35 which engages in the notches of a lever 36 pivoted to one of the longitudinal bars by a bolt 37. The pin 12 on the disk 11 is adapted to contact with the inwardly projecting free end of the latch lever 36 so as to depress the free end and raise the outer or notched end from engagement with the pin 35. Pivotally mounted between the plates 15 is the lever 40 connected at its lower end to an angular member 41. To the angular member is connected an adjusting bolt 42 having attached thereto the coil spring 43 whose other end is connected to a hooked link 44 pivoted at 45 to the setting lever 33. A link 46 connects the latch 36 to the link 44 so that the tension of the spring 43 is exerted upon the latch to hold it in engagement with the pin 35. The upper end of the lever 40 carries upon it the pivoted U-shaped dog 47 whose U-shaped end overlaps the margin of the disk 7 and engages with the teeth of said disk. Mounted upon the opposite longitudinal frame bar is the pivoted rod 48 having pivotally attached thereto the inwardly projecting dog 49 whose end is downwardly bent as at 49$^a$ to engage with the teeth on the disk 7 and prevent a reverse motion of the disk. The angular member 41 is adapted to be connected to any suitable reciprocating part A of a gas engine or motor C, as for instance, a sparking lever and a cam B, so that a reciprocating motion may be given to the lever 40 and a step-by-step motion communicated to the disk 7. Upon the lever 33 is a connection 50 which leads to the throttle valve actuating mechanism of the engine and also to the valve of an oil cup or other lubricating device. The switch 30 is connected in circuit with the spark coil so that upon a retraction of the lever 33, the switch arm 31 will be shifted to break the circuit to the spark coil.

As illustrative of the application of our mechanism we have shown diagrammatically the cylinder of the motor C as provided with a spark plug 51. A wire 52 leads to the secondary of an induction coil D and from thence to one terminal 31$^a$ of the switch. From the other terminal 31$^b$ a wire 53 leads to a ground. The frontal valve of the engine C is designated 54 and is shown as connected by a chain 50 to the lever 33.

The operation of our invention is as follows: The disks 9 and 11 may be set to any desired number on their graduated scales. With the ordinary speed of an engine, it requires forty seconds to make one revolution of disk 7. Now supposing that the disks 9 and 11 are set so that the number "2" on the graduated scale is opposite to the index pointer, it will be obvious that it will require sixty-two revolutions of the disk 7 to operate the trip and stop the engine, and thus the device will be tripped in about one hour. By setting the disks 9 and 11 so that the numeral "30" on the graduated scale comes opposite to the index pointer, the mechanism will be set so that it will run eight hours and then automatically disconnect the engine. This is done by opening the switch in the ignition circuit. In order to prevent any waste of the liquid fuel or the lubricating fluid, the operating member 33 is also connected, as described, to any suitable means for controlling the flow of the fuel and lubricating fluid to the engine. It will be obvious too that by operating the lever 36 by hand, the various parts will be disconnected. Upon raising the lever 36, the spring 43 will act to draw the lever 33 inward, as before described.

While we have shown what we believe to be the best and most effective form of our apparatus, we do not wish to be limited to this form, as it is obvious that various changes may be made in minor details and the form of arrangement of the parts, without departing from the spirit of our invention.

Having thus described the invention, what is claimed as new is:—

1. A device of the character described including a train of coacting disks, means moving each disk through a portion of a revolution upon a complete revolution of the disk engaging therewith, motor-actuated means for giving a step by step movement to the first disk of the train, a pivoted motor-controlling lever, means acting to move the lever in one direction, a latch for holding said lever from said movement, means mounted on the last disk of the train to release the latch from its engagement with the lever when the last disk of the train has completed its revolution, an ignition circuit, and means operatively connected to the controlling lever for breaking said ignition circuit upon a release of said lever by the latch.

2. A device of the character described including a frame composed of oppositely arranged longitudinal bars connected by transverse cross pieces, a train of disks mounted on said cross pieces and overlapping each other, means for moving each disk through a portion of a revolution upon a complete revolution of the disk engaging therewith, motor actuated means for giving a step by step movement to the first disk of the train, a pivoted motor controlling lever mounted on one of the side bars of the frame, a motor, electrical ignition devices on the motor, a switch to which the controlling lever is connected, an electric circuit including the electrical ignition devices and said switch, means acting to move the lever in one direction to cause the switch to break the ignition circuit, means holding the lever from movement, and means for releasing said lever upon a complete revolution of the last disk of the train to break the circuit to the ignition devices and simultaneously actuate the motor controlling lever to move it in one direction.

3. A device of the character described including opposed longitudinally extending frame-bars, a plurality of toothed disks mounted on said cross-pieces, said disks overlapping each other and each disk having thereon a pin projecting from its face and adapted to engage with a tooth on the next succeeding disk to give said next succeeding disk a movement through a portion of a revolution upon a complete revolution of the first disk, a reciprocating lever pivoted upon one of the frame-bars, means for reciprocating said lever from an explosive engine, a dog on said lever engaging with the first disk of the train for a step-by-step movement, a motor controlling lever pivoted to one of the frame-bars, a latch also pivoted to said frame-bars and detachably engaging the controlling lever to lock it in one position, a stud on the last disk of the train so disposed as to engage said latch, a spring acting to move the lever in one direction, an electrical switch mounted on one end of the frame-bars and adapted to be connected in circuit with the ignition device of said engine, a connection between said switch and the controlling lever whereby the switch shall be opened when the controlling lever is moved by the spring to break the circuit to the ignition devices, and a connection from said lever to the fuel controlling devices of said engine whereby upon an actuation of the lever by the spring the switch shall be opened to break the circuit to the ignition devices and the fuel supply to said engine simultaneously closed.

4. A device of the character described, including opposed longitudinally extending frame bars connected by a plurality of transverse cross pieces, a plurality of toothed disks mounted on said cross pieces, each disk having thereon a pin projecting from its face, engaging with a tooth on the next succeeding disk to give said next successive disk a movement through a portion of a revolution upon a complete revolution of the first disk, a motor-actuated reciprocating lever pivoted upon one of the frame bars, a dog on said lever, engaging with the first disk of the train for a step-by-step movement, a dog mounted on the opposite frame bar and engaging with the teeth of the first disk of the train for preventing a reverse movement of said disk, a controlling lever pivoted to one of the frame bars, a latch also pivoted to said frame bars and having notches engaging the controlling lever to lock it in one position, said latch projecting over the last disk of the train, a stud on said last disk, located to engage with said latch and move it to release the lever, a spring acting to move the controlling lever in one direction, an electrical switch mounted upon one of the frame bars and adapted to be connected to the ignition devices of a motor, and a connection between the said switch and the controlling lever, whereby the switch shall be opened when the controlling lever is moved by the spring.

5. A device of the character described, including opposed longitudinally extending frame bars connected by a plurality of cross bars, a toothed disk mounted on each of the cross bars, each disk having a pin projecting from its face, adapted to engage with a tooth on the next succeeding disk, a lever pivoted on one of the frame bars and having an inward projection at one end engaging with motor-actuated reciprocating devices, a dog on the other end of the lever, engaging with the teeth of the first disk of the train for a step-by-step movement, a hooked dog mounted on the opposite frame bar and engaging with said teeth to prevent a reverse movement of the disk, a controlling lever pivoted to the frame, an electrical switch adapted to be connected to the ignition devices of a motor, a connection between the lever and the switch, whereby when the lever is moved in one direction, the switch is broken, a latch engaging the lever to hold it against movement, a spring connected to one of the frame bars and at its other end connected to said lever to move it to break the switch, and a stud on the last disk of the train, located to engage with said latch to move it to release the lever.

In testimony whereof we affix our signatures in presence of two witnesses.

TJEBBE D. BEINTEMA. [L. S.]
DICK DE ROOI. [L. S.]

Witnesses:
JOHN F. LACEY,
LENA L. ROWE.